UNITED STATES PATENT OFFICE.

THOMAS JONES, OF ACME, TEXAS, ASSIGNOR TO ACME CEMENT PLASTER COMPANY, A CORPORATION OF ILLINOIS.

CEMENT.

No. 916,165.           Specification of Letters Patent.       Patented March 23, 1909.

Application filed April 29, 1908. Serial No. 429,889.

*To all whom it may concern:*

Be it known that I, THOMAS JONES, a citizen of the United States, and a resident of Acme, in the county of Hardeman and State of Texas, have invented a new and Improved Cement, of which the following is a full, clear, and exact description.

My invention relates to cements, my more particular object being to produce a type of cement analogous to the well-known article of commerce ordinarily designated as "Keene's cement".

The so-called Keene's cement, generally speaking, is a gypseous plaster well known and extensively used in England (where it originated), and also upon the continent of Europe. It is employed in instances where a high degree of finish combined with extreme hardness and strength are required for plaster work. The original method of its manufacture consisted in steeping dehydrated gypsum in alum solution and then recalcining. The process, however, was quite expensive. Numerous futile attempts have been made in the United States to manufacture this cement or its equivalent and repeated failures have resulted. They are due, no doubt, to imperfect acquaintance with the nature and chemical properties of the essential materials, and with the proper method of treatment of these materials. It is probable that many fallacious statements as to the method of manufacture of this cement, which have been given publicity in various technical publications, are mainly responsible for ignorance of the essential requisites for the production of the cement.

The object of my present invention is to produce a material of the general nature of so-called Keene's cement, my product being a material of the highest grade and excellence and made by the most direct method and at the least possible expense. I employ only one calcination. The plasticity and ultimate hardness of the product are brought about by chemical substances added together as hereinafter described.

The first step in my method is the selection of pure gypsum rock. This must be practically free from magnesia and iron. If magnesia be present in the rock it causes the formation of magnesium sulfate, which is detrimental, and the presence of iron even in very minute quantities causes the formation of iron salts which weaken the finished cement and also discolor the same. Pure gypsum rock having been found in a suitable quantity I break the rock into pieces of convenient size, preferably each of about twenty pounds weight, and place in a suitable kiln, at the same time scattering over the charge, so as to be evenly dispersed through the mass, forty pounds of tribasic aluminum sulfate $(Al_2O_3SO_33H_2O)$ in the form of a fine granulated powder, for every one thousand pounds of gypsum rock, and then calcine until the charge is of a full red heat. The calcination may be effected either in contact with the gases of combustion or out of contact therewith, the main requisite being that the material be subjected continuously to a perfectly oxidizing atmosphere. This may be accomplished by the admission of an amount of air to the fire-box or flue sufficient to oxidize completely the fuel gases before their entrance into the kiln or oven. When the charge has been perfectly calcined and is afterward cooled, I transfer it to a crusher and then to a mill in which it is reduced to a fine powder. This powder (consisting of anhydrous sulfate of lime and anhydrous subsulfate of alumina) is laid aside for the moment. I now take of caustic potash two hundred and twenty-four (224) pounds, which I dissolve in twenty (20) gallons of water in an iron pan which I heat from beneath. The solution is thus caused to boil, and while boiling hot I add to the solution three hundred and sixty (360) pounds of a pure and finely comminuted silicious sand. Under suitable conditions, however, a smaller proportion of the sand will suffice, various proportions thereof being employed according to purity of the materials. I keep the solution boiling and constantly agitated until all of the water has been driven off; there remains a viscous mass of potassium bisilicate which rapidly sets and hardens. I allow the mass to cool, and then break it into fragments of convenient size. These I place in a suitable oven or reverberatory furnace and burn them at a full red heat (substantially as above described with reference to the gypsum rock) for a period of eight or ten hours until incipient vitrification ensues. Then, while the mass is red hot and in a viscous condition, I withdraw it from the furnace and plunge it suddenly into two or three times its own weight of water. This water should be held in a lead-lined tank provided with a water jacket and with means whereby the tank may be heated. Violent ebullition ensues and the heated mass becomes dissolved in a few minutes. If the solution were effected by other means it might require several hours in its accomplishment.

When the solution of the heated mass is complete, I allow it to cool, and then pour it by degrees into a solution consisting of one part of ordinary commercial sulfuric acid and two and one-half parts of water by weight and thoroughly mix the two solutions together. The silicate must be added to the solution in such proportion as to neutralize perfectly the acid in the water, the product consisting of a stiff paste of potassium sulfate and gelatinous silica. I then transfer this paste to drying ovens in which I allow it to remain until all uncombined water is expelled, taking care to avoid too high a temperature in so doing, as this would occasion decomposition of the sulfate. I therefore never allow the heat to approach that of redness. It it now removed and thereafter ground to a fine powder, either by itself or admixed with the burned gypsum and alumina. If the materials are ground together care should be taken to maintain them in proper proportions. These are from twenty to twenty-five pounds of the compound just described, to one thousand and fifty pounds of the burned gypsum and alumina. Being admixed in this proportion the process is complete. The product then consists approximately of the following ingredients:

| | | |
|---|---|---|
| Calcined gypsum | 1020 | pounds. |
| Sub-sulfate of alumina | 30 | " |
| Dry gelatinous silica | 14 | " |
| Potassium sulfate | 11 | " |

The product just described is a cement.

For the decomposition of the potassium bisilicate I may use either potash alum or normal aluminum sulfate ($Al_2O_3 3SO_3$) admixed with eighteen parts of water. This gives excellent results when proper proportions are maintained as above described, these being substantially the proportions in which the several chemical re-actions take place.

The silicate compound above described consists of dry gelatinous silica ninety-one parts, and potassium sulfates eighty-seven parts. When this compound is ground separately from the gypsum, the mixture of gelatinous silica and potassium sulfate should be twenty to twenty-five parts to one thousand and fifty parts of gypsum and alumina. These proportions are based upon the balanced affinities of the several elements for each other and can not be departed from to any great extent without injury to the product.

By the calcination of the gypsum rock in contact with the tribasic aluminum sulfate, I greatly reduce the cost of both calcination and grinding, thus dispensing with unnecessary labor and cutting down the cost of fuel. Not only this, but the quality of the burned gypsum is greatly improved, while the tribasic aluminum sulfate is itself perfectly calcined. This is a result most difficult to accomplish by itself, for the reason that when heated, the tribasic aluminum sulfate runs together in a mass which renders its calcination unequal, thus necessitating the waste of much fuel and requiring much time and patience to effect a thorough calcination. Much time is also gained and the effectiveness of material greatly increased, by the withdrawal of the heated bisilicate and plunging the latter suddenly into the water. I find that by this step the solution of the bisilicate is quickened to such an extent that it is as complete within a few minutes as would otherwise be the case in as many hours.

The perfect decomposition attained by treatment of the bisilicate with acid, resulting in the formation of gelatinous silica and potassium sulfate, produces a material which may be ground with as much ease as the gypsum itself. Moreover, this brings the ingredients into exactly the condition required for combination with the gypsum in the ultimate product.

By the method of treatment above described, I find that there is another advantage, to wit, I can subject the compound to a comparatively high degree of heat and thereby secure a more complete combination between the silica and the alkali, and effect a more thorough decomposition than is possible by grinding together the two compounds.

By withdrawing the mass while in a viscous condition an opportunity is afforded to re-charge the furnace and allow the calcination to proceed continuously. When potash alum is used to decompose the silicate, one hundred and fifty-eight pounds are allowed for every fifty-six pounds of caustic potash used. If normal aluminum sulfate $$Al_2O_3 3SO_3 + 18H_2O$$

be used for the purpose, one hundred and eleven pounds for every fifty-six pounds of potash will be required to effect the same approximate result.

Having thus described my invention, I claim as new and desire to secure by Letters Patent:

1. The cement herein described, containing calcined gypsum, sub-sulfate of alumina, dry gelatinous silica, and potassium sulfate.

2. The cement herein described, containing the following substances in the proportions stated, to wit: calcined gypsum one thousand and twenty pounds, sub-sulfate of alumina thirty pounds, dry gelatinous silica fourteen pounds, and potassium sulfate eleven pounds.

3. The method herein described of preparing a cement, which consists in adding tribasic aluminum sulfate to gypsum rock, calcining the admixture to a red heat, crushing the residuum to powder, preparing potassium bisilicate, subjecting said potassium silicate to the action of sulfuric acid so as to form potassium sulfate, reducing said potassium sulfate to the form of a dry powder and admixing said potassium sulfate with said first-mentioned powder.

4. The method herein described of preparing cement which consists in calcining gypsum rock and tribasic aluminum sulfate, reducing said materials to the form of a powder, preparing potassium sulfate also in the form of a powder, and admixing said powders together.

5. The method herein described of preparing cement, which consists in making potassium bisilicate at a red heat, bringing it suddenly into contact with water, so as to cause it to form a solution therewith, and admixing it with sulfuric acid so as to form potassium sulfate.

In testimony whereof I have signed my name to this specification in the presence of two subscribing witnesses.

THOMAS JONES.

Witnesses:
J. L. ELBERT,
S. J. MATTHEW.